(12) United States Patent
Lorraine et al.

(10) Patent No.: US 10,107,431 B2
(45) Date of Patent: Oct. 23, 2018

(54) FLEXIBLE HOSE GUARD

(71) Applicant: Swan Products LLC, Sandy Springs, GA (US)

(72) Inventors: Steven Lorraine, Glastonbury, CT (US); Timothy O'Connor, Eden, NY (US); Erick Williams, Roswell, GA (US)

(73) Assignee: Swan Products, LLC, Sandy Springs, GA (US)

( * ) Notice: Subject to any disclaimer, the term of this patent is extended or adjusted under 35 U.S.C. 154(b) by 0 days.

(21) Appl. No.: 15/935,541

(22) Filed: Mar. 26, 2018

(65) Prior Publication Data

US 2018/0224038 A1 Aug. 9, 2018

Related U.S. Application Data

(63) Continuation-in-part of application No. 14/525,725, filed on Oct. 28, 2014.

(60) Provisional application No. 61/896,913, filed on Oct. 29, 2013.

(51) Int. Cl.
    *F16L 35/00* (2006.01)
    *F16L 57/02* (2006.01)
    *F16L 11/04* (2006.01)

(52) U.S. Cl.
    CPC ............... *F16L 35/00* (2013.01); *F16L 11/04* (2013.01); *F16L 57/02* (2013.01)

(58) Field of Classification Search
    CPC ............. F16L 11/04; F16L 57/02; F16L 35/00
    USPC .................. 285/114, 115, 116; 138/109, 110
    See application file for complete search history.

(56) References Cited

U.S. PATENT DOCUMENTS

| | | |
|---|---|---|
| 438,356 A | 10/1890 | McEnany |
| 1,509,802 A | 9/1924 | Weigand |
| 2,185,741 A | 1/1940 | Sorg |
| 2,266,211 A | 12/1941 | Kaiser |
| 2,640,502 A | 6/1953 | Powers |
| 2,700,988 A | 2/1955 | Smisko |
| 2,825,588 A | 3/1958 | Howard |
| 3,017,203 A | 1/1962 | MacLeod |
| 4,602,808 A | 7/1986 | Herron et al. |
| D296,581 S | 7/1988 | Hattori et al. |
| 4,867,485 A | 9/1989 | Seckel |
| 4,962,582 A | 10/1990 | Puls |
| 5,143,409 A | 9/1992 | Laikos et al. |
| 5,315,748 A | 5/1994 | Seckel |

(Continued)

FOREIGN PATENT DOCUMENTS

GB 2091498 A1 7/1982

*Primary Examiner* — Aaron M Dunwoody
(74) *Attorney, Agent, or Firm* — Polsinelli, PC

(57) ABSTRACT

Anti-kinking device to prevent kinking of a hose, the device having a neck portion having a threaded internal surface; and a mesh pattern portion connecting the neck portion and a terminal portion; wherein the mesh portion has a central axis and comprises a plurality of equally configured rectangular open spaces between each mesh pattern in a relaxed state, each mesh pattern having a plurality of rectangular inner walls, a plurality of substantially rectangular outer walls, and a plurality of opposing sidewalls connecting the inner and outer walls, the sidewalls having planar linear portions with respect to the central axis. A hose system is provided including a hose inserted through the anti-kinking device.

15 Claims, 18 Drawing Sheets

(56) References Cited

U.S. PATENT DOCUMENTS

| | | |
|---|---|---|
| 5,316,348 A | 5/1994 | Franklin et al. |
| 5,333,650 A | 8/1994 | Folkman et al. |
| 5,368,235 A | 11/1994 | Drozdoff et al. |
| 5,390,272 A * | 2/1995 | Repta .................. G02B 6/3887 |
| | | 385/100 |
| 5,498,043 A | 3/1996 | Goldenberg |
| 5,626,369 A | 5/1997 | Shifman et al. |
| 5,857,711 A | 1/1999 | Comin-Dumong et al. |
| 5,894,866 A | 4/1999 | Horst et al. |
| 5,996,637 A * | 12/1999 | Larsson .................. E03C 1/021 |
| | | 138/109 |
| 5,996,639 A | 12/1999 | Gans et al. |
| 6,012,494 A | 1/2000 | Balazs |
| 6,494,496 B1 * | 12/2002 | Sweeney ................ F16L 35/00 |
| | | 138/110 |
| D501,539 S | 2/2005 | Dyer et al. |
| D512,492 S | 12/2005 | Lipscomb et al. |
| 7,108,292 B2 | 9/2006 | Lipscomb et al. |
| 7,677,812 B2 * | 3/2010 | Castagna ............. G02B 6/4478 |
| | | 385/69 |
| D622,810 S | 8/2010 | Wright |
| D707,334 S | 6/2014 | Hernandez et al. |
| D723,670 S | 3/2015 | Lorraine |
| 2004/0036285 A1 | 2/2004 | Guivarc'h et al. |
| 2009/0165865 A1 | 7/2009 | Parker |
| 2009/0250924 A1 | 10/2009 | Tisbo et al. |
| 2014/0361531 A1 | 12/2014 | Siders et al. |

* cited by examiner

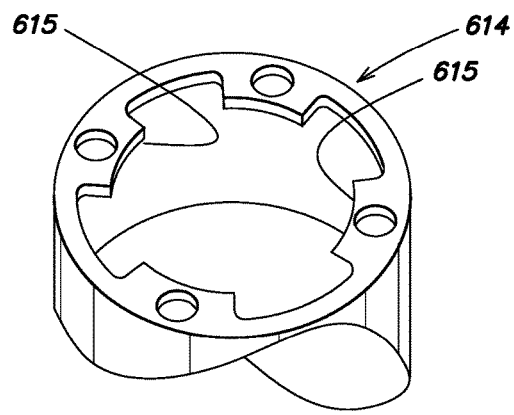
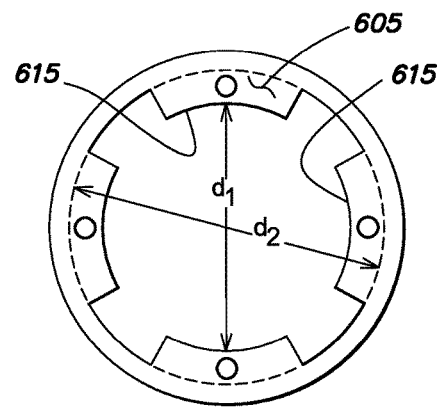
FIG. 21A    FIG. 21C
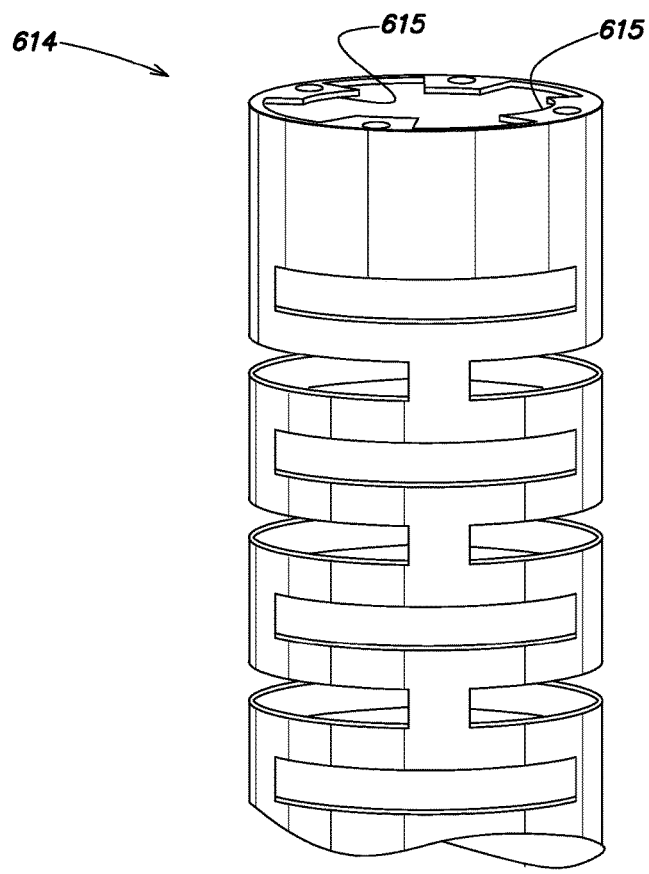
FIG. 21B

FLEXIBLE HOSE GUARD

CROSS-REFERENCE TO RELATED APPLICATIONS

This application is a continuation-in-part of U.S. application Ser. No. 14/525,725 filed Oct. 28, 2014 and entitled "FLEXIBLE HOSE GUARD", which claims the benefit of priority to U.S. Provisional Application 61/896,913 filed Oct. 29, 2013 and entitled "Hose and Flexible Hose Guard," the disclosures of which are herein incorporated by reference in their entirety.

FIELD OF THE INVENTION

The present invention relates to garden or other types of hoses, and more specifically is directed to a device to prevent kinking of a hose.

BACKGROUND OF THE INVENTION

Flexible hose has been manufactured for many years, first out of natural rubber and more recently out of petrochemical derivatives such as synthetic rubber, thermoplastic rubbers or plastics. "Kinking" occurs when the hose is doubled over or twisted. Kinking also occurs due to the routine movements of the user. A consequence of kinking is that the fluid flow through the hose can be either severely restricted or stopped. Kinking is a nuisance, causing the user to waste time unkinking the hose.

Current garden and other types of water hoses may be provided with wire springs or solid plastic "wrenches" in an attempt to prevent kinking. However, when the hose is pulled hard at an angle, thereby putting strain on the hose, the hose kinks at the end of the spring. This also happens with the wrenches.

The conventional wire springs are attached to the ferrule of a garden hose by decreasing the diameter of the first coil of the spring. However, this makes it difficult to attach and remove from the ferrule. Additionally, the rigid wire springs are prone to corrosion because they are subjected to the outside elements, e.g., temperature and weather changes.

SUMMARY OF THE INVENTION

In an aspect, there is provided an anti-kinking device for a hose system comprising a neck portion having a threaded internal surface; and a coil portion connecting the neck portion and a terminal portion; wherein the coil portion has a central coil axis and comprises a plurality of spaced apart windings with open spaces between each winding in a relaxed state, each winding having a substantially cylindrical inner wall, a substantially cylindrical outer wall, and sidewalls connecting the inner and outer walls, the sidewalls having planar angled portions with respect to the coil axis; wherein the device is a substantially cylindrical body having a through bore; and wherein the planar angled portions of the sidewalls engage to prevent the windings from slipping against each other when the windings are in a bent state.

In another aspect, there is also provided a hose inserted through the anti-kinking device; and a ferrule having a plurality of parallel concentric rings on the outer surface and attached to an end of the hose; wherein the threaded internal surface of the neck portion of the device is attached to the plurality of parallel concentric rings on the outer surface of the ferrule.

In a further aspect, there is provided a hose having a female end inserted through the anti-kinking device; and a coupler having a tail inserted into the female end of the hose; wherein the female end of the hose is crimped between the threaded internal surface of the neck portion of the device and the coupler.

Moreover, there is provided, in another aspect, a hose having a female end and a male end and inserted through two anti-kinking devices; wherein the terminal portion of each device is positioned towards a center of a length of the hose, and the neck portion of one of the two devices is positioned towards the female end of the hose and the neck portion of the second of the two devices is positioned towards the male end of the hose; a ferrule having a plurality of parallel concentric rings on the outer surface is crimped onto the male end of the hose; wherein the threaded internal surface of the neck portion of the second of the two devices is attached to the plurality of parallel concentric rings on the outer surface of the ferrule; and a coupler having a tail is inserted into the female end of the hose; wherein the female end of the hose is crimped between the threaded internal surface of the neck portion of one of the two devices and the coupler.

Further, there is provided a hose having a female end and a male end and inserted through an anti-kinking device comprising a neck portion having a threaded internal surface; and a coil portion connecting the neck portion and a terminal portion having a threaded internal surface; and a ferrule having a plurality of parallel concentric rings on the outer surface and attached to a female end of the hose; wherein the threaded internal surface of the neck portion of the device is attached to the plurality of parallel concentric rings on the outer surface of the ferrule.

Further, in another embodiment, there is provided an anti-kinking device for a hose system comprising a neck portion having a threaded internal surface; and an alternating mesh pattern portion connecting the neck portion and a terminal portion; wherein a plurality of interconnected alternating mesh pattern portions has a central axis and comprises a plurality of equally spaced rectangular open spaces between each mesh pattern in a relaxed state, each mesh pattern having a plurality of substantially rectangular inner walls, a plurality of substantially rectangular outer walls, and a plurality of sidewalls connecting the inner and outer walls, the plurality of opposing sidewalls having planar linear portions with respect to the central axis; wherein the device is a substantially cylindrical body having a through bore; and wherein the planar linear portions of the opposing sidewalls prevent the mesh patterns from slipping against each other when the device is in a bent state.

In one embodiment of the invention, a hose system is provided, comprising a hose inserted through an anti-kinking device, the anti-kinking device comprising: a cylindrical body having a through-bore with a constant inner diameter, the through-bore defined between a first circular opening of the cylindrical body and a second circular opening of the cylindrical body; a plurality of interconnected alternating mesh pattern portions, wherein the first circular opening and the second circular opening of the cylindrical body are coupled to one another by the plurality of interconnected alternating mesh pattern portions, the mesh pattern portions comprising a plurality of equally configured rectangular open spaces between each mesh pattern in a relaxed state, each mesh pattern comprising a plurality of substantially rectangular inner walls, a plurality of substantially rectangular outer walls, and a plurality of opposing sidewalls connecting the inner and outer walls, wherein the opposing sidewalls include planar linear portions with respect to the central axis; and a plurality of projections, the projections arranged circumferentially about the second circular opening to radially extend from a lip of the second circular opening towards a central longitudinal axis of the through-bore, such that a diametric extent between the plurality of projections is smaller than the diameter of the first circular opening and the diameter of the second circular opening.

In one embodiment, a coupling element is coupled to a ferrule of the hose, such that one or more of the plurality of projections are constrained between the coupling element and the ferrule of the hose along the central longitudinal axis.

In one embodiment, the device is made of durable materials.

In one embodiment, the device is made from a synthetic polymer.

In one embodiment, the synthetic polymer is selected from the group consisting of acrylonitrile butadiene styrene (ABS), nylon, acrylics, celluloid, cellulose acetate, cyclic olefin copolymer, ethylene-vinyl acetate (EVA), ethylene vinyl alcohol (EVOH), fluoroplastics, polyacrylates, polyacrylonitriles, polyamides, polyamide-imide, polyaryletherketone, polybutadiene, polybutylene, polybutylene terephthalate, polycaprolactone, polychlorotrifluoroethylene, polycarbonate, polyester, polyethylene, polyetherimide, polyethersulfone, polyimide, polyphenylene oxide, polypropylene, polystyrene, polysulfone, polyurethane, polyvinyl acetate, polyvinyl chloride, polyvinylidene chloride, and styrene-acrylonitrile.

In accordance with another embodiment of the invention, an anti-kinking device for a hose system is provided comprising: a substantially cylindrical body made of a synthetic polymer material having a through bore with a constant inner diameter, the through-bore defined between a first circular opening of the cylindrical body and a second circular opening of the cylindrical body; a neck portion, the neck portion comprising a plurality of projections arranged circumferentially about the second circular opening to radially extend from a lip of the second circular opening towards a central longitudinal axis of the through-bore, such that a diametric extent between the plurality of projections is smaller than the diameter of the first circular opening and the diameter of the second circular opening; a plurality of interconnected alternating mesh pattern portions connecting the first circular opening and the second circular opening, the mesh pattern portions comprising a plurality of equally configured rectangular open spaces between each mesh pattern in a relaxed state, each mesh pattern comprising a plurality of substantially rectangular inner walls, a plurality of substantially rectangular outer walls, and a plurality of opposing sidewalls connecting the inner and outer walls, wherein the opposing sidewalls include planar linear portions with respect to the central axis; and wherein the planar linear portions of the opposing sidewalls prevent the plurality of interconnected alternating mesh pattern portions from slipping against each other when the device is in a bent state.

In one embodiment, a hose inserted through the anti-kinking device.

In one embodiment, the device relieves a strain on the hose.

In one embodiment, a ferrule is attached to an open distal end of the hose, the ferrule having an outer diameter greater than or equal to the outer diameter of the hose and greater than the diametric extent between the plurality of projections; and a coupling element is coupled to the ferrule, such that one or more of the plurality of projections are constrained between the coupling element and the ferrule of the hose along the central longitudinal axis.

In one embodiment, the neck portion comprises four or more evenly and symmetrically spaced projections.

In one embodiment, the ferrule attached to the open distal end of the hose is crimped to the coupling element, and the coupling element is capable of coupling the hose system to a source of potable water.

In one embodiment, the hose is made from soft vinyl plastic, natural rubber, synthetic rubber or thermoplastic rubber.

In one embodiment, the hose system further comprises a female end of the hose.

In one embodiment, a ferrule is crimped onto the female end of the hose.

In one embodiment, the ferrule has a plurality of parallel concentric rings on the outer surface of the ferrule on the female end of the hose and the neck portion has a helical threaded internal surface that is twisted onto the concentric rings of the ferrule.

BRIEF DESCRIPTION OF THE DRAWINGS

FIGS. 4-8 are a series of perspective views illustrating the steps of an assembly process for attaching the device of FIG. 1A to a hose, wherein FIG. 4 shows a hose inserted through the device of FIG. 1A;

FIG. 5 shows a ferrule having a plurality of parallel concentric rings on the outer surface attached to the hose assembly of FIG. 4;

FIG. 6 shows both the ferrule and a coupler at the end of the hose assembly;

FIG. 7 shows the device, a ferrule (not visible), and a coupler fully assembled on the end of the hose;

FIGS. 11A-D are a series of perspective views illustrating the steps of an assembly process according to another embodiment of the invention, for attaching two devices of FIG. 1A to a hose, wherein FIG. 11A shows a hose inserted through two devices;

FIG. 11B shows a ferrule having a plurality of parallel concentric rings on the outer surface attached to each end of the hose system of FIG. 11A;

FIG. 11C shows a ferrule at the male end of the hose, and a coupler at the female end, without a ferrule, according to another embodiment of the invention, of the hose system of FIG. 11A;

FIG. 11D shows the two devices, a ferrule (not visible on the male end of the hose), and a coupler, fully assembled at each end of the hose system;

FIGS. 12A-C are a series of perspective views illustrating the steps of an assembly process according to another embodiment of the invention for attaching the device of FIG. 10A to a hose wherein FIG. 12A shows a hose inserted through the device;

FIG. 12B shows a ferrule fully assembled at the male end of the hose, and a ferrule (on the female end is not visible) and coupler, fully assembled at the female end of the hose system;

FIG. 12C shows a device of FIG. 10A and a ferrule (not visible on the male end of the hose) fully assembled at the male end of the hose system, and a ferrule and a coupler fully assembled at the female end of the hose system;

FIG. 21A is a top perspective view of an anti-kinking device configured with a plurality of radial projections;

FIG. 21B is a front view of the anti-kinking device of FIG. 21A;

FIG. 21C is a top-down diagrammatic representation of an anti-kinking device configured with a plurality of radial projections;

DETAILED DESCRIPTION

Figure 1A:
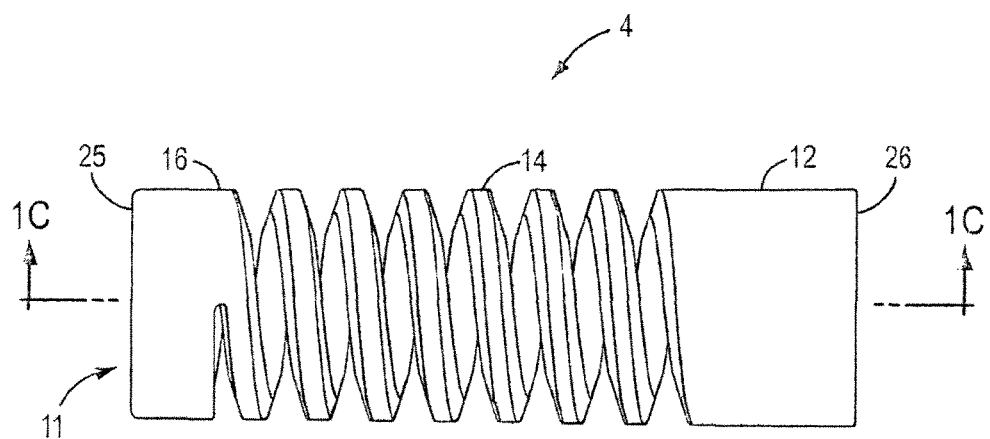
FIG. 1A is a perspective view of a device according to one embodiment of the invention, the device including a neck portion, coil portion, and terminal portion.
Figure 1B:
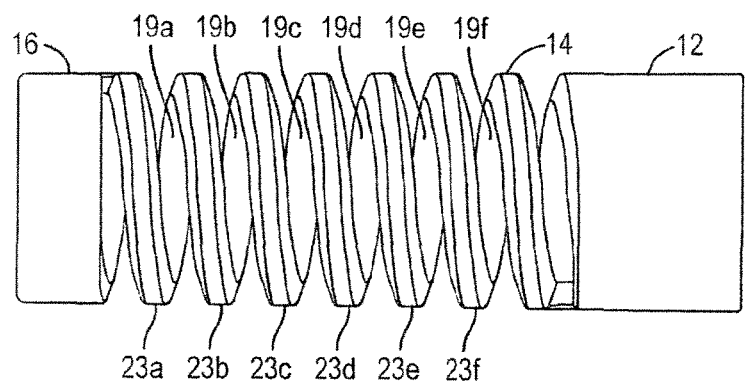
FIG. 1B is a perspective view of the device of FIG. 1A, rotated 90 degrees.
Figure 1C:
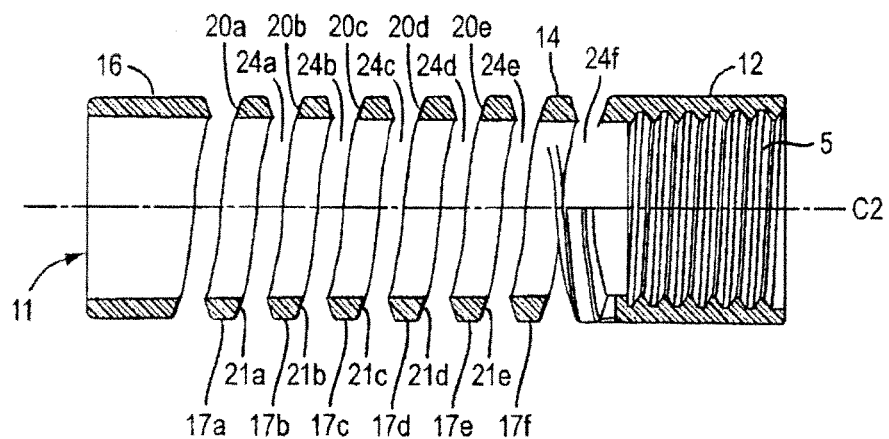
FIG. 1C is a longitudinal cross-sectional view of the device of FIG. 1A.
Figure 1D:
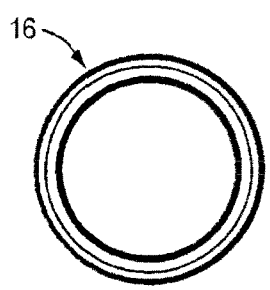
FIG. 1D is an end view of the terminal portion of the device of FIG. 1A.
Figure 1E:
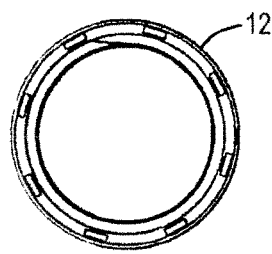
FIG. 1E is an end view of the neck portion of the device of FIG. 1A.
Figure 1F:
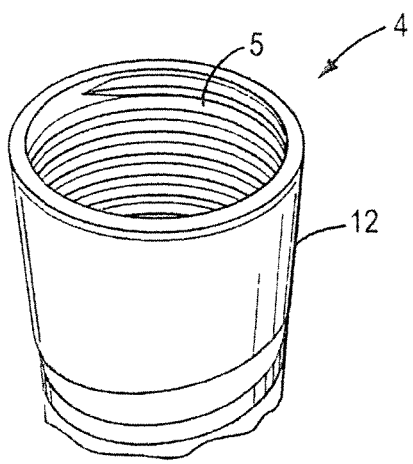
FIG. 1F is a perspective view showing the neck portion of the device of FIG. 1A having a threaded internal surface.

The present invention is directed to a device applied to a hose that can reduce the likelihood of kinking of the hose, and in particular will reduce kinking of a hose portion adjacent to a faucet or at the base of the device, when a strain has been placed on the hose, such as when the hose is pulled at an angle. As shown in the embodiment of FIGS. 1A-C, the anti-kinking device 4 is a substantially cylindrical body having a through bore 11 and including a neck portion 12 at one end 26; a terminal portion 16 at the opposing end 25; and a central coil portion 14 connecting the neck portion 12 and the terminal portion 16. The device has a central cylindrical axis C2. As shown in FIGS. 1C, 1E, and 1F, the neck portion 12 has a threaded internal surface 5, here more specifically a helical threaded internal surface. In an alternative embodiment, the neck portion can have a grooved or corrugated internal surface, e.g., parallel concentric rings. However, the helical threaded internal surface 5 is preferred because it provides more surface contact area for attachment to the plurality of parallel concentric rings of a ferrule. Also, rotation of the helical threaded internal surface of the device and the rings of the ferrule will move the device up (longitudinally along the cylindrical axis of) the ferrule, e.g., by using a twisting motion, to provide a tighter attachment to the ferrule.

Figure 8A:
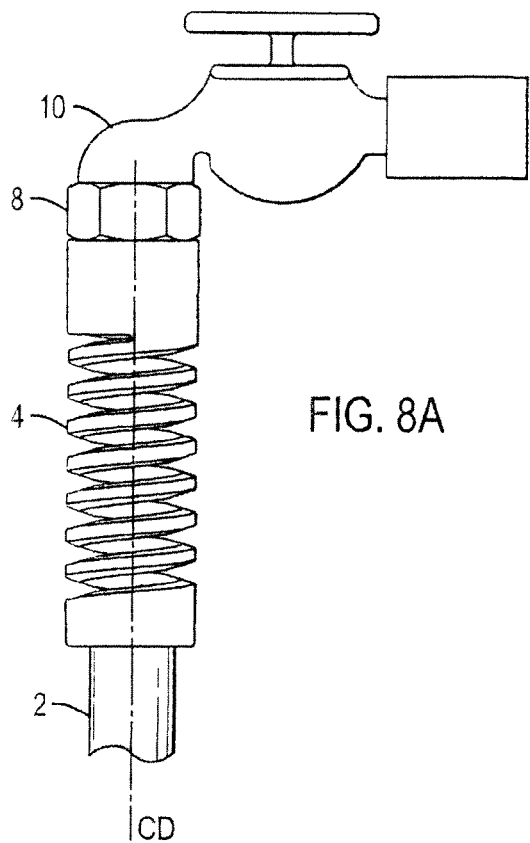
FIG. 8A is a perspective view of the fully assembled hose system of FIG. 7 attached via the coupler to a faucet, wherein no strain has been placed upon the hose.
Figure 8B:
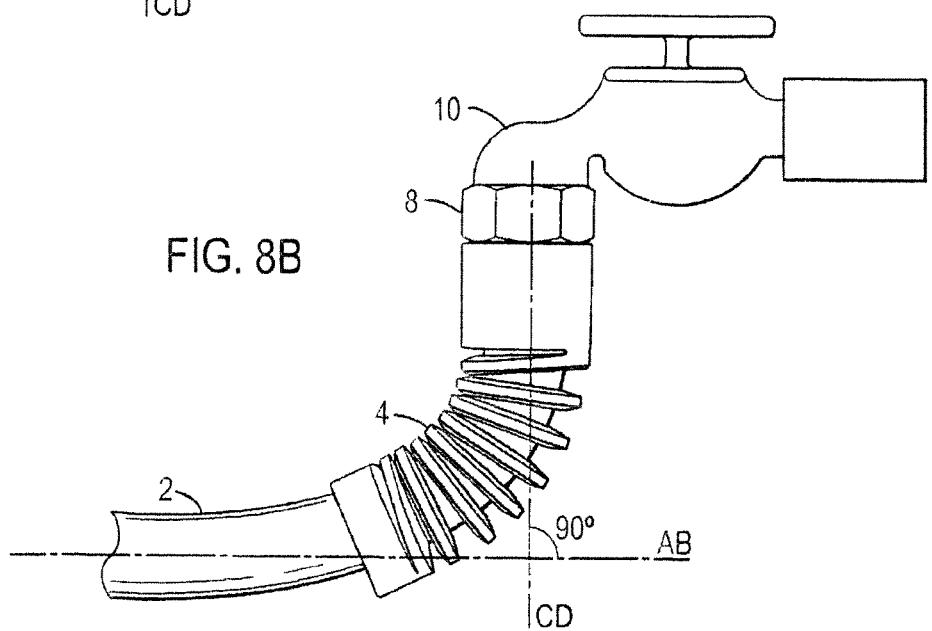
FIG. 8B is a perspective view of the fully assembled hose system of FIG. 7, wherein a strain has been placed upon the hose and wherein the device prevents kinking of the bent hose.

As shown in FIGS. 1A-C, the coil portion 14 has a central axis C2 and comprises a plurality of spaced apart windings, e.g., 17a, 17b, 17c, etc. with open spaces, e.g., 24a, 24b, 24c, etc between the windings. Each winding has a substantially cylindrical inner wall 19, a substantially cylindrical outer wall 23 concentric with the inner wall, and sidewalls 20, 21 connecting the inner and outer walls. The sidewalls having planar angled portions with respect to the coil axis. More specifically, the opposing sidewalls are oppositely angled so as to converge toward the outer wall, such that the outer wall is of a lesser length than the inner wall. The planar angled portion of the sidewalls prevents the windings from slipping against each other and causing the device to lose its shape, as occurs with the prior art circular wirings. In particular, the planar angled portions of the adjacent windings engage each other to reduce the strain being placed on the hose. A cross-sectional view of a winding has the general shape of a trapezoid, wherein the inner and outer wall are roughly parallel to each other, the angles formed between the sidewalls and the inner wall are acute, and the angles formed between the planar angled sidewalls and the outer wall are obtuse, and the sidewalls converge radially going from the (longer) inner wall toward the (shorter) outer wall. The corners of the inner walls act like hinge points when the coil portion is bent, i.e., the adjacent corners of two adjacent coils will meet and the adjoining sidewalls will converge and nest one alongside the other as shown in FIG. 8B.

The coil windings are thus designed to nest along their outer walls and prevent the collapse or kinking of the hose portion located inside the device. In particular, as shown in FIG. 8A, when no strain is placed on the hose (the hose is linear), the coil windings are in a relaxed state (linear, spaced apart relation) along axis line CD. However, as shown in FIG. 8B, when a strain is placed upon the hose along axis line AB, then the angled portion of the sidewalls of device 4 engage each other to prevent the hose 2, which has been inserted through the device 4, from kinking either near the faucet or at the end of the terminal portion of the device. As shown in FIG. 1D, the terminal portion 16 of the device can be smooth on both the outside and inside surfaces. The device can have substantially the same inner diameter throughout the length of the device. The size of the inner diameter is not particular to the device, so long as a hose can be inserted there through and the neck portion of the device can attach onto a ferrule at an end of the hose. In particular, the threaded internal surface of the neck portion of the device can engage the plurality of parallel concentric rings on the outer surface of a ferrule. In other aspects, the device can be tapered toward the terminal portion or toward the neck portion.

The device can be made from durable materials that will withstand temperature and weather changes. In an aspect, the device is made from synthetic polymers, such as nylon and plastics, including thermosetting and thermoplastics, selected from the group consisting of acrylonitrile butadiene styrene (ABS), nylon, acrylics, celluloid, cellulose acetate, cyclic olefin copolymer, ethylene-vinyl acetate (EVA), ethylene vinyl alcohol (EVOH), fluoroplastics, polyacrylates, polyacrylonitriles, polyamides, polyamide-imide, polyaryletherketone, polybutadiene, polybutylene, polybutylene terephthalate, polycaprolactone, polychlorotrifluoroethylene, polycarbonate, polyester, polyethylene, polyetherimide, polyethersulfone, polyimide, polyphenylene oxide, polypropylene, polystyrene, polysulfone, polyurethane, polyvinyl acetate, polyvinyl chloride, polyvinylidene chloride, and styrene-acrylonitrile. Any plastic material with or without other nonplastic fillers may be used, so long as the coil windings are flexible and will bend along with the hose when a bending force, e.g., a strain, is applied to the hose.

The device disclosed herein can be used in a hose system. The hose system can comprise a hose, at least one anti-kinking device, optionally at least one ferrule, and optionally a coupler. In one embodiment, as shown in FIGS. 4-8, the hose system comprises a hose 2, the anti-kinking device 4, a ferrule 6, and a coupler 8. Various permutations of the disclosed hose system are contemplated herein and will be discussed further below.

The hose 2 for use in the disclosed hose system can be flexible and may be made from multi-ply vinyl, rubber, and non-reinforced vinyl. For example, the hose may be made from soft vinyl plastic, natural rubber, synthetic rubber or thermoplastic rubber. The hose can be cut squarely at one end and any burrs can be removed in order to insert the hose into the anti-kinking device.

As disclosed herein, the hose system can comprise at least one ferrule 6. A ferrule 6 is a sleeve or cap, typically metal that can be used to attach a coupling 8 to a hose 2. The inside diameter of the ferrule 6 should be sized to slip over the hose for which the ferrule is intended. In an aspect, the inner diameter of the ferrule 6 can range from about 0.2" to about 1.0", from about 0.38" to about 0.75", and from about 0.45" to about 0.625". The length of the ferrule 6 can be from about 0.4" to about 1.5", from about 0.5" to about 1.0", and about 0.625" to about 0.72". The size of the hole at the end of the ferrule 6 should be big enough to accept a coupling tail 9.

Figure 2:
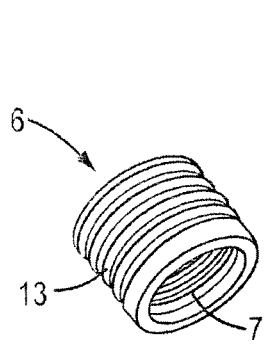
FIG. 2 is a perspective view of a ferrule having a plurality of parallel concentric rings on the inner and outer surfaces.

The internal 7 and outer 13 surface of the ferrule 6 can have a plurality of parallel concentric rings, as shown in FIG. 2. The parallel concentric rings allow the threaded internal surface of the neck portion of the device to grab and move up, e.g., by twisting the device, the ferrule thereby providing a stronger attachment. In an aspect, the internal and outer surface of the ferrule can be smooth.

Figure 11C:
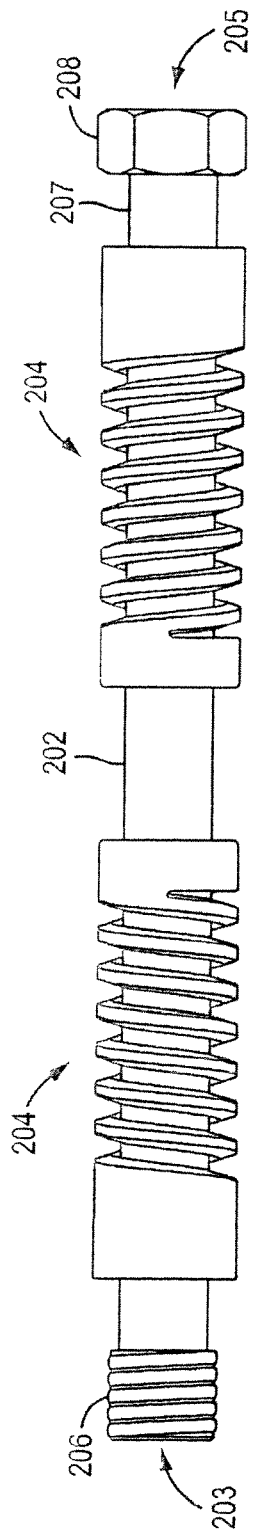
Figure 12A:
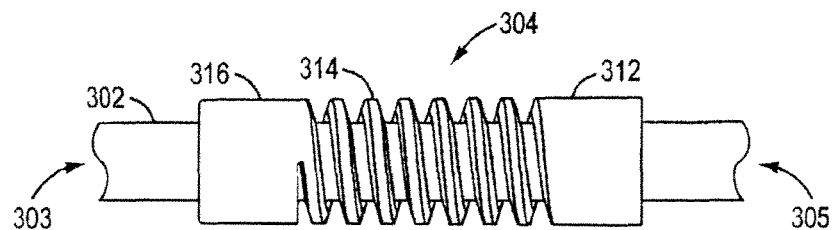
Figure 12B:
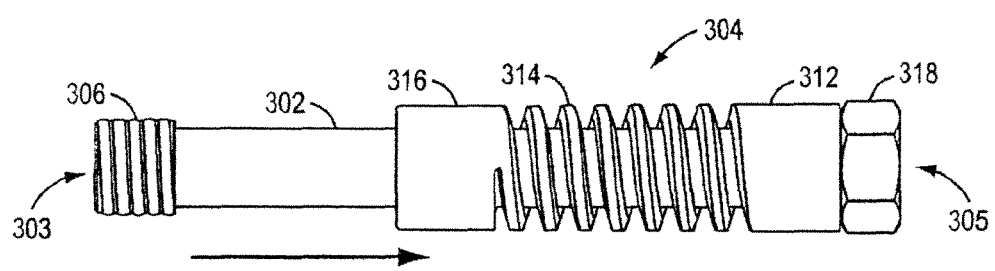
Figure 12C:
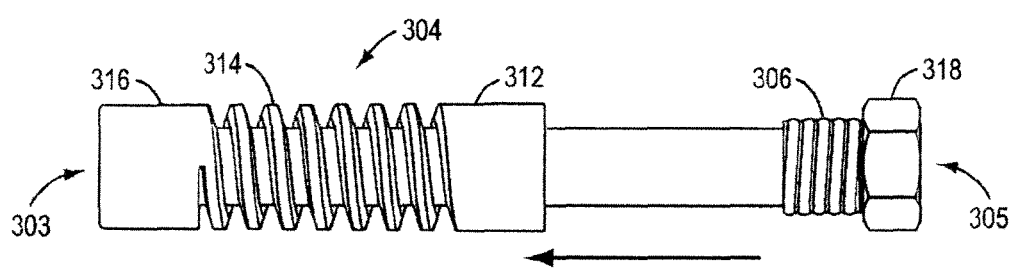

In an embodiment, a ferrule 306 can be present at the female end of the hose 305 and at the male end of the hose 303, as shown in FIGS. 12B-C. In another embodiment, a ferrule 206 can be present at just the male end of the hose 203, as shown in FIG. 11C.

Figure 3:
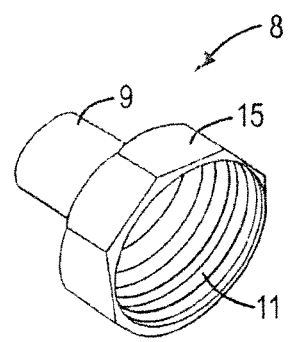
FIG. 3 is a perspective view of a coupler having a smooth cylindrical tail portion, and a neck portion with a threaded internal surface and hexagonal outer surface.

The coupling 8, for use in the disclosed hose system, is a fitting that allows a hose 2 to be fastened either to an additional hose or some type of faucet 10. There are also couplings known as expansion hose fittings that effectively enable a hose of one diameter to couple with a second hose of a larger diameter. As shown in FIG. 3, the outer diameter of the tail 9 of the coupling 8 must be able to slide into the hose 2, for example 7/16 inch, 19/32 inch, 1/2 inch, 5/8 inch, and 3/4 inch. The length of the tail 9 should match the length of the ferrule 6. The coupling 8 can have a threaded internal surface 11 for attachment to a faucet and an outer hexagonal surface of the neck portion 15 of the coupling.

The coupler and the ferrule can be made from any suitable material, such as brass, aluminum, copper, plated steel, steel, and stainless steel. Steel with zinc or nickel plating is also an option. For those applications, where the hose is designed to deliver potable water, lead free brass may be used. The ferrules and couplers may be annealed for ease of crimping.

Figure 4:
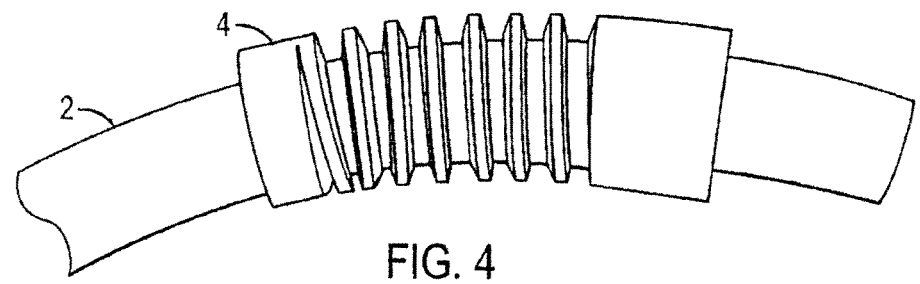
Figure 5:
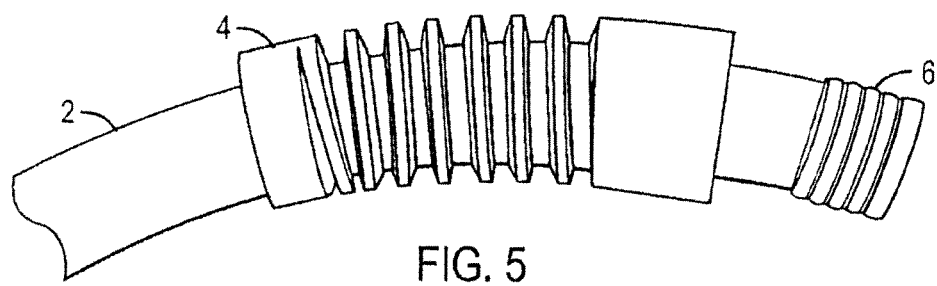
Figure 6:
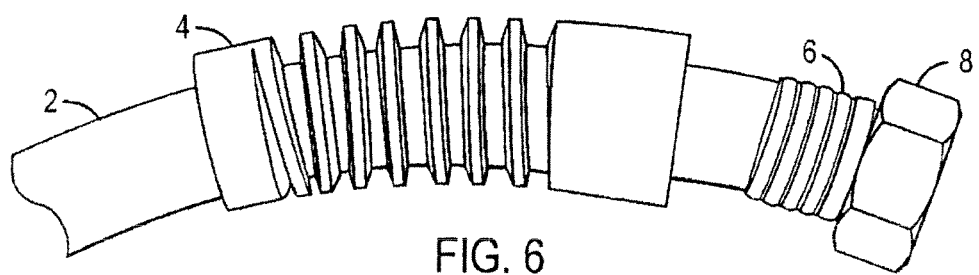

A method of making a hose system, according to one embodiment of the invention, is illustrated in FIGS. 4-7. FIG. 4 illustrates a hose 2 inserted through the device 4 of FIGS. 1A-F. A ferrule 6 is then placed onto an end of the hose, as illustrated in FIG. 5. A coupler 8 having a tail is then inserted into the end of the hose having a ferrule, as illustrated in FIG. 6. The coupler and ferrule are then crimped.

Crimping of ferrules and/or couplings and/or the disclosed device onto hoses can be achieved by any technique known in the art, such as those disclosed in U.S. Pat. No. 4,867,485, the disclosure of which is hereby incorporated by reference. In the embodiment illustrated in FIG. 6, the ferrule 6 and the coupler 8 are placed onto the hose 2. The fingers of a crimping machine are inserted into the hose with the ferrule and coupler in place. The fingers then apply physical pressure to the inside surface of the tail of the coupler thereby deforming some portion of the tail 9 of the coupler 8 and crimping the hose 2 into the inside surface of the ferrule 7, as shown in FIG. 2. The crimping is done in a corrugated fashion, i.e., there are areas of greater and lesser compression.

Figure 7:
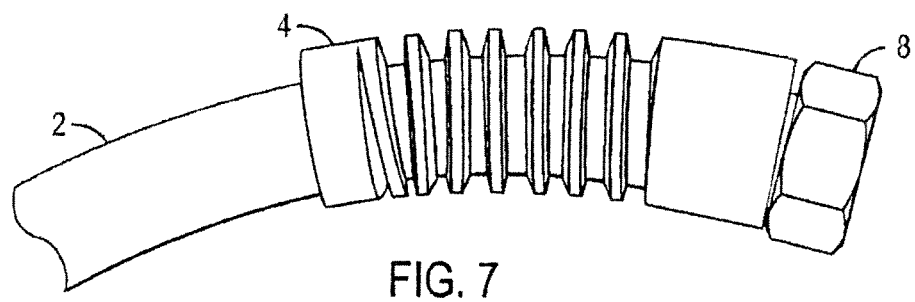

After crimping the coupler 8 and ferrule 6 onto the hose 2, the neck portion of the device 4 is then moved up and over the outer surface of the ferrule, as shown in FIG. 7. In particular, the threaded internal surface of the device can engage the parallel concentric rings on the outer surface of a ferrule 6, as shown in FIGS. 6-7. In an aspect, the device can be twisted onto the ferrule thereby allowing the threaded internal surface to move up and over the parallel concentric rings. In this manner, the device can be "attached" to the ferrule when in use and can be unattached from the ferrule when it is no longer needed.

Figure 9A:
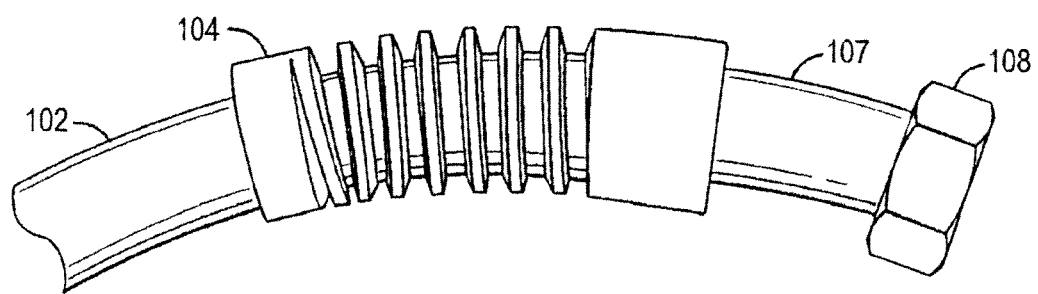
FIG. 9A is a perspective view of a hose system, according to another embodiment of the invention, showing a hose inserted through the device of FIG. 1A, with a coupler inserted into the end of the hose, and without a ferrule.
Figure 9B:
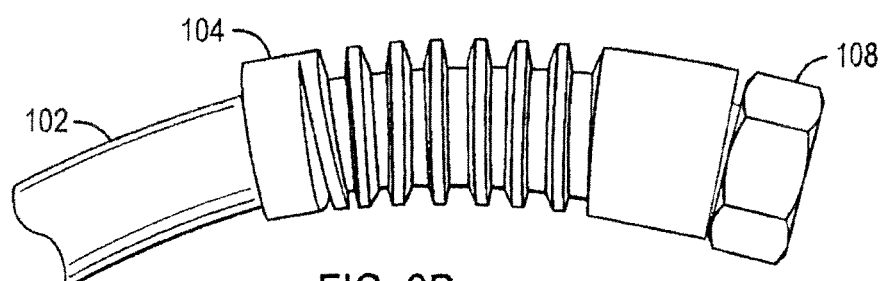
FIG. 9B is a perspective view of the hose system according to another embodiment of the invention, showing an anti-kinking device and a coupler fully attached on the end of the hose, but without a ferrule present.

In another embodiment for making a hose system, a hose system comprising a hose, the anti-kinking device, and a coupler, is shown in FIGS. 9A-B. The hose 102 is inserted through the device 104, and a coupler 108 is inserted into one end of the hose, without the presence of a ferrule 107. The device 104 is then slid up the hose towards the base of the outer surface of the coupler. The coupler, hose, and device are then crimped such that the outward expansion of the hose and tail of the coupler during the crimping process create a friction fit thereby holding the anti-kinking device in place at one end of the hose. In this embodiment, the device cannot be moved, i.e, slid up and down the hose, as in the first embodiment. This embodiment provides a cost savings and increased time efficiency during manufacture by eliminating the time and expense of installing a ferrule at the female end of the hose.

Figure 10A:
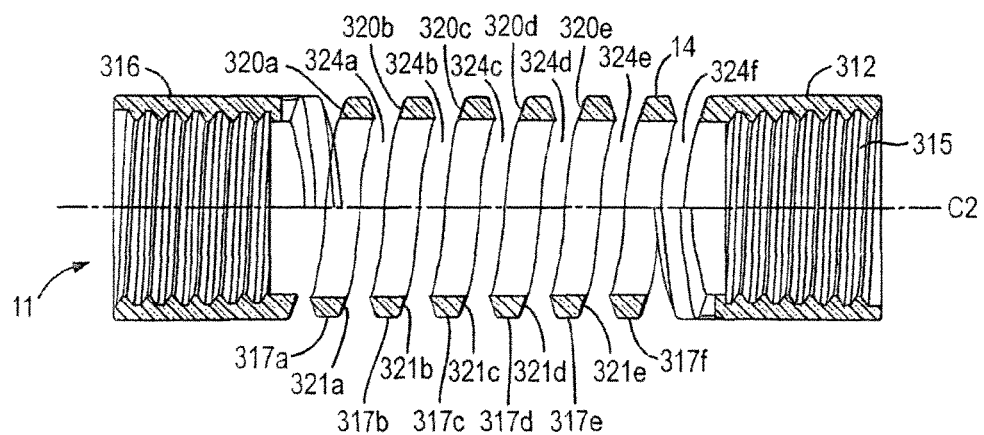
FIG. 10A is a longitudinal cross-sectional view of an anti-kinking device according to another embodiment of the invention, the device including a neck portion, coil portion, and a terminal portion.
Figure 10B:
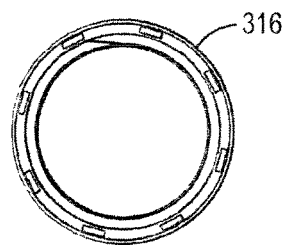
FIG. 10B is an end view of the terminal portion of the device of FIG. 10A.

A typical garden or water hose has a female end and a male end, wherein each end has a ferrule. The present invention therefore contemplates a device 304 wherein both the neck portion 312 and the terminal portion 316 have threaded internal surfaces, as shown in FIGS. 10A-B. The device 304 is a substantially cylindrical body having a through bore 311 and including a neck portion 312 at one end having a threaded internal surface 315; a terminal portion 316 at the opposing end having a threaded internal surface; and a central coil portion 314 connecting the neck portion 312 and the terminal portion 316. The device has a central cylindrical axis C2 and comprises a plurality of spaced apart windings, e.g., 317a, 317b, 317c, etc. with open spaces, e.g., 324a, 324b, 324c, etc between the windings. Each winding has a substantially cylindrical inner wall, a substantially cylindrical outer wall, and sidewalls 320a, 321a connecting the inner and outer walls. The sidewalls having planar angled portions with respect to the coil axis.

A hose system for use with the device 304 of FIG. 10A comprises a hose, at least one ferrule, and the device 304 wherein both the neck portion and the terminal portion have threaded internal surfaces. To make such a hose system, a hose 302 having male end 303 and female end 305 would be inserted through the device 304, as shown in FIG. 12A. The device having a terminal portion 316, a coil portion 314, and a neck portion 312. A ferrule 306 would then be placed onto the female end of the hose 305, and a male end of the hose 303. A coupler 318 would also be placed into the female end of the hose 305. The ferrules and couplers would then be crimped onto the hose. When in use, the device 304, by its neck portion having a threaded internal surface, can be attached onto the ferrule 306 at the female end of the hose 305, as shown in FIG. 12B (the ferrule at the female end of the hose is not visible). The device 304 can then be detached from the ferrule 306 at the female end of the hose, slid down the length of the hose 302, and attached onto the ferrule 306 at the male end of the hose 303 using the terminal portion having a threaded internal surface of the device 304, as shown in FIG. 12C (the ferrule at the male end of the hose is not visible).

Figure 11A:
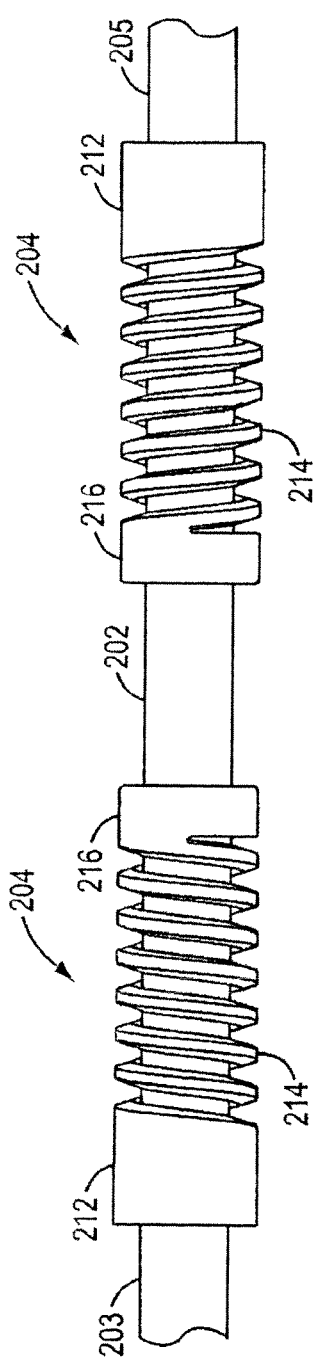
Figure 11B:
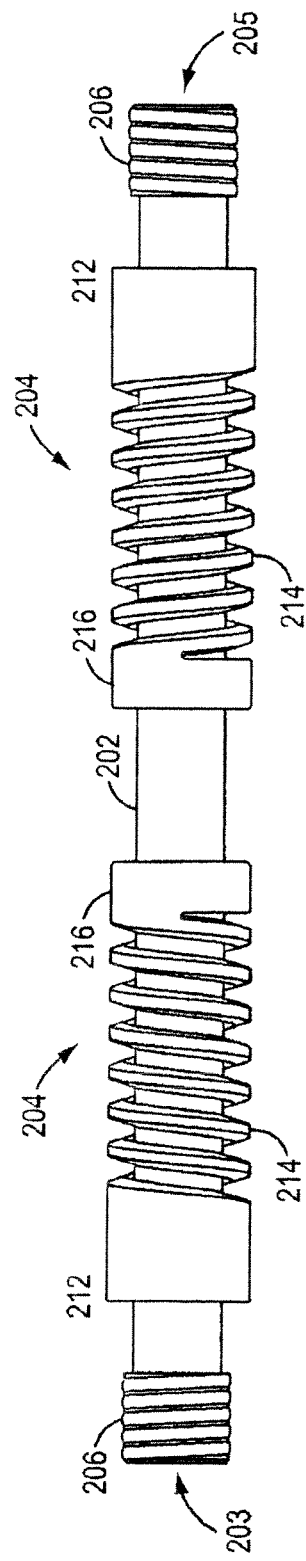
Figure 11D:
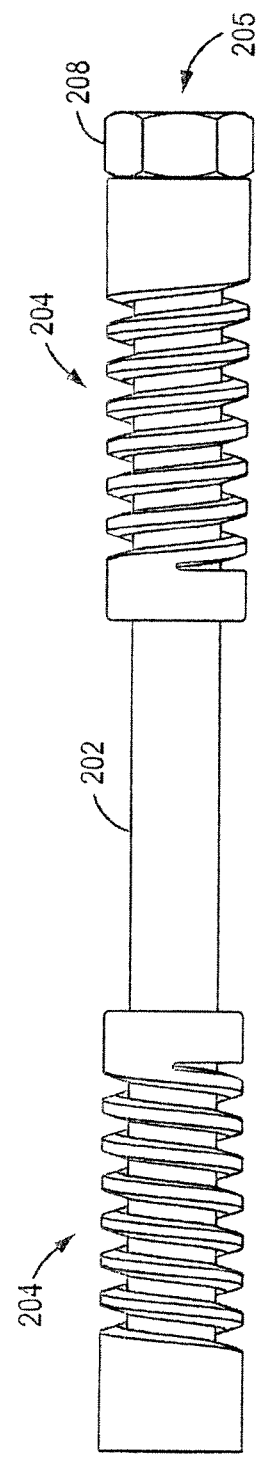

In another embodiment, there is disclosed a hose system comprising a hose 202, at least one of the disclosed devices 204, at least one ferrule 206, and optionally a coupler 208, as shown in FIGS. 11A-D. For example, a hose 202 could be inserted through two devices (204), wherein each device has a neck portion 212 having a threaded internal surface, a coil portion 214, and a terminal portion 216. In this embodiment, the terminal portion 216 of each device 204 should be positioned toward the center of the hose 202 and the neck portion 212 of each device 204 should be positioned toward the female 205 and male 203 ends of the hose 202, as shown in FIG. 11A. A ferrule 206 should be placed onto each end 203, 205 of the hose 202, as shown in FIG. 11B. In an alternative embodiment, a ferrule 206 can be placed on the male end 203 of the hose 202 and a coupler 208 can be placed onto the female end 205 of the hose, wherein the female end of the hose does not have a ferrule 207, as shown in FIG. 11C. The ferrule 206 on the male end 203 of the hose is then crimped. The device 204 on the female end of the hose is slid so that the neck portion abuts the base of the coupler 208 and the two are crimped onto the hose. The device 204 near the male end of the hose is slid down the length of the hose so that the neck portion of the device 204 slides up and over the parallel concentric rings of the ferrule 206 which has been crimped on the male end of the hose 203, as shown in FIG. 11D. In this embodiment, the hose 202 is prevented from kinking as a result of a strain placed on the hose at both the female and male ends.

Figure 13:
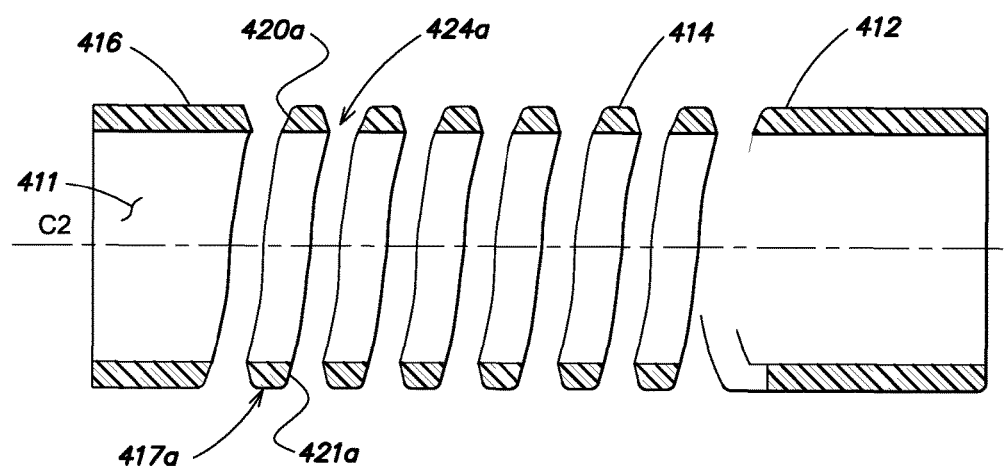
FIG. 13 is a longitudinal cross-sectional view of an anti-kinking device according to another embodiment of the invention, the device including a neck portion, coil portion, and a terminal portion.

In a further embodiment as shown in FIG. 13, there is disclosed an anti-kinking device comprising a neck portion 412, a coil portion 414 connecting the neck portion 412 and a terminal portion 416; wherein the coil portion 414 has a central coil axis C2 and comprises a plurality of spaced apart windings 417a with open spaces 42a between each winding in a relaxed state, each winding having a substantially cylindrical inner wall, a substantially cylindrical outer wall, and sidewalls 420a, 421a connecting the inner and outer walls, the sidewalls having planar angled portions with respect to the coil axis; wherein the device is a substantially cylindrical body having a through bore 411; and wherein the planar angled portions of the sidewalls engage to prevent the windings from slipping against each other when the windings are in a bent state. In particular, the neck portion has a smooth internal surface.

As can be seen, the disclosed hose system can comprise various components, such as a hose, at least one device, optionally at least one ferrule, and optionally a coupler. Any and all permutations on the above-described embodiments are contemplated.

Figure 14:
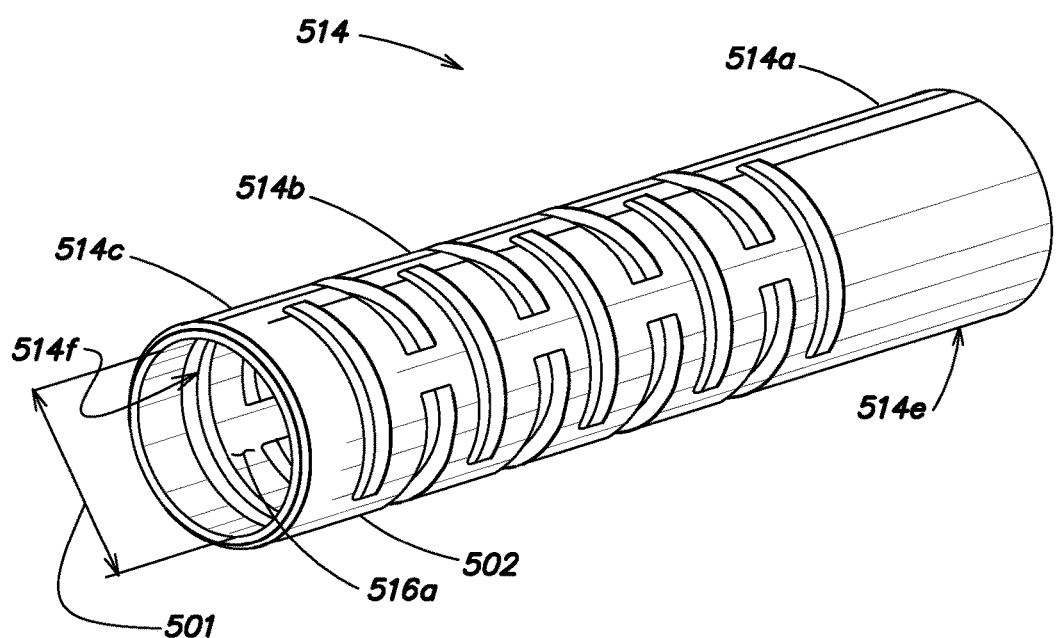
FIG. 14 is a perspective view of a device according to one embodiment of the invention, the device including a neck portion, alternating mesh portion and terminal portion.
Figure 17:
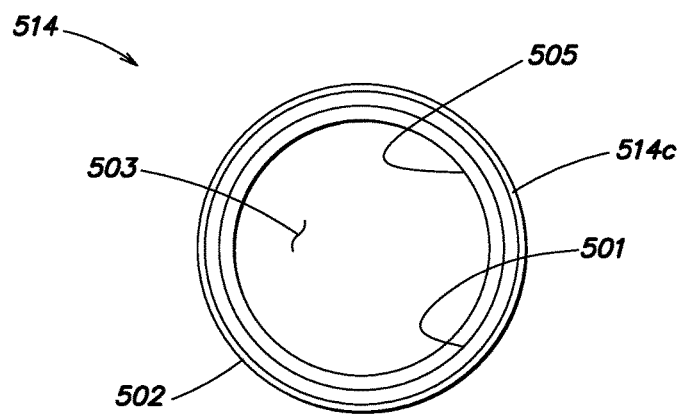
FIG. 17 is an end view of the terminal portion of the device of FIG. 14.
Figure 18:
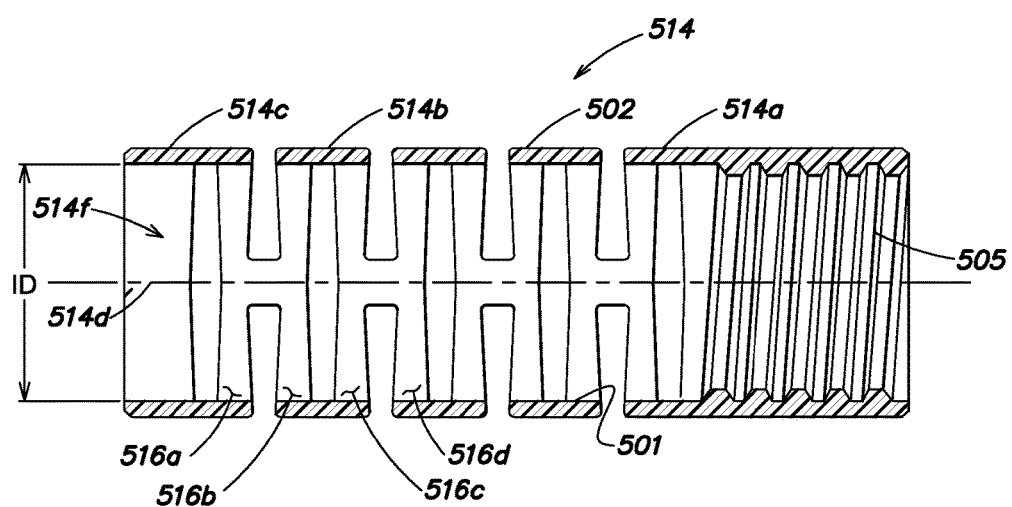
FIG. 18 is a longitudinal cross-sectional view of the device in FIG. 14 showing the neck portion of the device and the threaded internal surface.

In another embodiment, as shown in FIG. 14, there is disclosed an anti-kinking device 514 for a hose system comprising a neck portion 514a having a threaded internal surface 505 (as shown in FIG. 18), and a plurality of interconnected alternating mesh pattern portions 514b connecting the neck portion 514a and a terminal portion 514c. The device 514 comprises a tubular body 514e which in the present embodiment is circular cylindrical, with inner ID and outer OD circumferential (circular cylindrical) surfaces 501, 502 respectively and an open bore 503 extending the complete axial length of the device (see FIG. 17).

Figure 15:
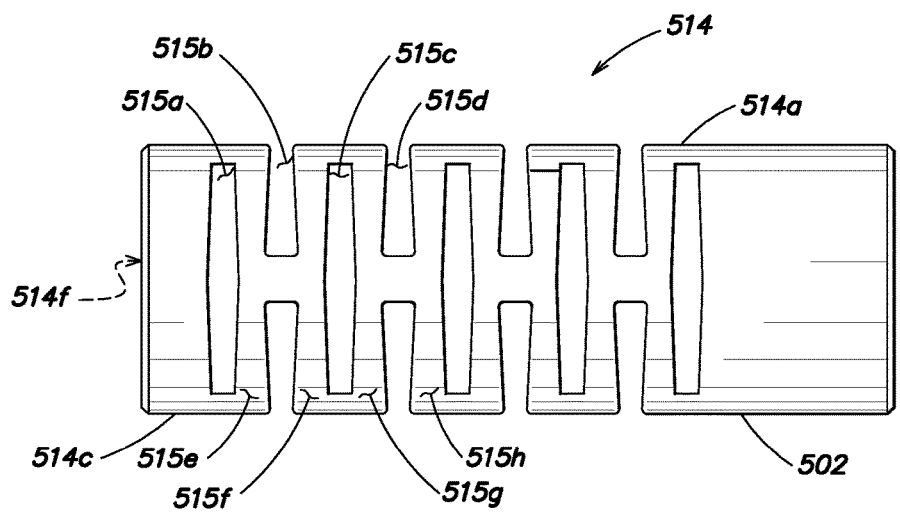
FIG. 15 is a perspective side view of the device in FIG. 14.
Figure 16:
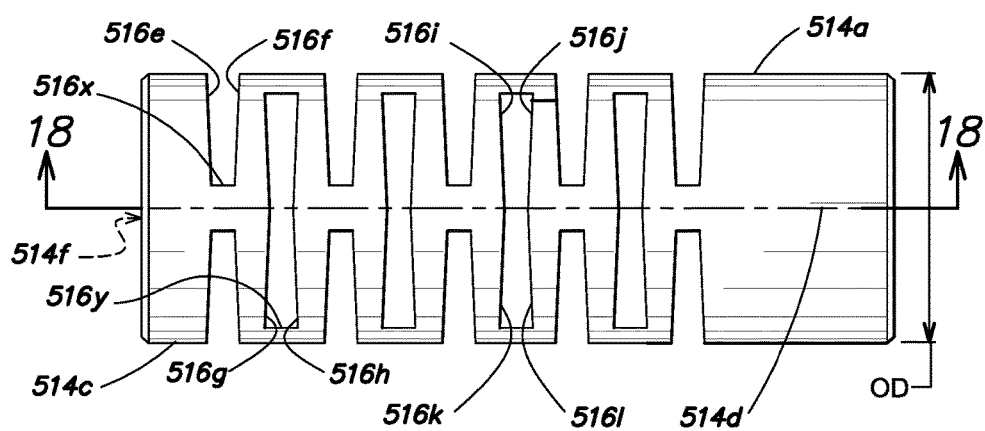
FIG. 16 is a perspective side view of the device in FIG. 15 rotated 90 degrees.

The interconnected alternating mesh pattern portion 514b has a central axis 514d (FIGS. 16, 18) and comprises a plurality of equally configured rectangular open spaces 515a, 515b, 515c, 515d (as shown in FIG. 15) between each mesh pattern in a relaxed state. Each mesh pattern 514b is comprised of a plurality of substantially rectangular inner walls 516a, 516b, 516c, 516d (as shown on the inner circumferential surface (ID) 501 in FIG. 18), a plurality of substantially rectangular outer walls 515e, 515f, 515g, 515h (as shown on the outer circumferential surface (OD) 502 in FIG. 15), and a plurality of opposing sidewalls 516e, 516f, 516g, 516h (as shown in FIG. 16) which connect the inner and outer walls 501, 502 respectively. The opposing sidewalls 516e, 516f, 516g, 516h (connected by end walls 516x, 516y) (as shown in FIG. 16) are radial cutouts across the tube wall and include planar linear portions 516i, 516j, 516k, 516l (as shown in FIG. 16) with respect to the central axis 514d. The tubular device 514 is thus a substantially cylindrical body 514e having a through bore 514f on the terminal portion 514c of the device 514; and where the planar linear portions 516i, 516j, 516k, 516l of the opposing sidewalls prevent the plurality of interconnected alternating mesh pattern portions 514b from slipping against each other when the device 514 is in a bent state (similar to that shown in FIG. 8B).

The plurality of interconnected alternating mesh pattern portions 514b are designed to abut against the exterior of the hose 2 and prevent the collapse or kinking of the hose portion located inside the device. The device 514 can be made from durable materials that will withstand temperature and weather changes. In an aspect, the device 514 is made from synthetic polymers, such as nylon and plastics, including thermosetting and thermoplastics, selected from the group consisting of acrylonitrile butadiene styrene (ABS), nylon, acrylics, celluloid, cellulose acetate, cyclic olefin copolymer, ethylene-vinyl acetate (EVA), ethylene vinyl alcohol (EVOH), fluoroplastics, polyacrylates, polyacrylonitriles, polyamides, polyamide-imide, polyaryletherketone, polybutadiene, polybutylene, polybutylene terephthalate, polycaprolactone, polychlorotrifluoroethylene, polycarbonate, polyester, polyethylene, polyetherimide, polyethersulfone, polyimide, polyphenylene oxide, polypropylene, polystyrene, polysulfone, polyurethane, polyvinyl acetate, polyvinyl chloride, polyvinylidene chloride, and styreneacrylonitrile. Any plastic material with or without other nonplastic fillers may be used, so long as the mesh pattern portions are flexible and will bend along with the hose when a bending force, e.g., a strain, is applied to the hose.

FIG. 16 shows the alternating mesh pattern of the device rotated 90° about the central cylindrical axis 514d, with respect to FIG. 15. As shown in FIGS. 15-16, when the device 514 is rotated 90 degrees the alternating mesh pattern portion retains its congruous pattern. As shown in FIG. 16, the device 16 has a central axis 514d. As shown in FIG. 17 (end view), the terminal portion 514c of the device 514 can be smooth on both the outside and inside surfaces. The non-threaded portion of the device can have substantially the same inner diameter ID throughout its length (see FIG. 18). The size of the inner diameter is not particular to the device, so long as a hose can be inserted there through and the threaded neck portion 514a of the device can attach onto a ferrule at an end of the hose.

As shown in FIG. 18, the neck portion 514a of the device has a threaded internal surface 505, here more specifically a helical threaded internal surface. In an alternative embodiment, the neck portion can have a grooved or corrugated internal surface, e.g., parallel concentric rings. However, the helical threaded internal surface 505 is preferred because it provides more surface contact area for attachment to the plurality of parallel concentric rings of a ferrule. Also, rotation of the helical threaded internal surface 505 of the device 514 and the rings of the ferrule will move the device 514 up (longitudinally along the cylindrical axis of) the ferrule, e.g., by using a twisting motion, to provide a tighter attachment to the ferrule.

Figure 19:
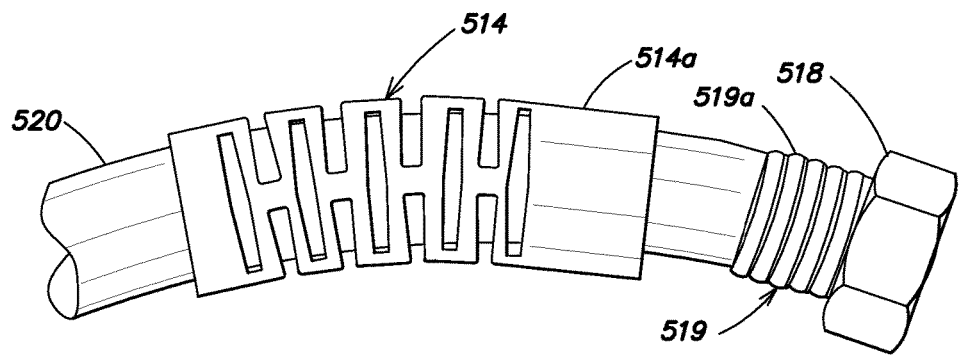
FIG. 19 is a perspective view of a hose ferrule being inserted into the neck portion of the device shown in FIG. 14.
Figure 20:
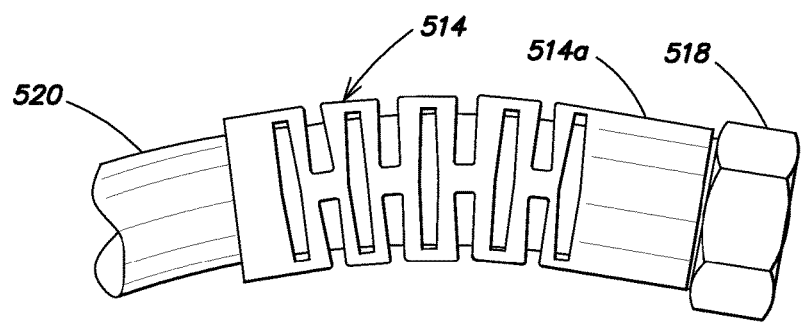
FIG. 20 is a perspective view of a hose ferrule inserted into the neck portion of the device shown in FIG. 14.

The device 514 can be attached to a ferrule at one end of a hose in a process similar to that illustrated in FIGS. 4-7. FIGS. 19-20, similar to FIGS. 6-7, show the device 514 positioned on an end portion of a typical garden or water hose 520, having at the end of the hose a ferrule 519 and coupler 518. The device 514 was previously inserted over the hose end portion, before attaching the ferrule 519 and coupler 518 (in a manner similar to that shown in FIGS. 4-6). Thus, after crimping the coupler 518 and ferrule 519 onto the hose 520, the neck portion 514a of the device 514 is then moved up and over the outer surface of the ferrule, as shown in FIG. 20. In particular, the threaded internal surface 505 of the device 514 can engage the parallel concentric rings 519a on the outer surface of the ferrule 519, as shown in FIGS. 19-20. In an aspect, the device can be twisted onto the ferrule thereby allowing the threaded internal surface to move up and over the parallel concentric rings. In this manner, the device can be attached to the ferrule when in use and can be unattached from the ferrule when it is no longer needed.

In some embodiments, the presently disclosed anti-kinking device (such as device 514) can be configured without any internal or external threading while still maintaining compatibility and the ability to couple with various hoses, ferrules, and couplings. Advantageously, such a configuration can permit the free rotation of the anti-kinking device with respect to a coupled hose, whereas the anti-kinking device 514 with threaded internal surface 505 remains in a rigid and fixed configuration with respect to an attached hose, unable to rotate or otherwise be repositioned. For example, FIGS. 21A-C depict various views of a coupling end of an exemplary anti-kinking device 614. In some embodiments, it is contemplated that anti-kinking device 614 shares many of the characteristics and features described above with respect to device 514 and the alternating mesh pattern provided about its longitudinal axis. However, whereas device 514 terminated in a constant diameter open mouth (as can be seen in FIG. 17), the anti-kinking device 614 does not.

More particularly, anti-kinking device 614 is instead provided with a plurality of radial projections 615, wherein each projection extends from an inner cylindrical wall of device 614 towards the central longitudinal axis of the device 614. The plurality of radial projections 615 can be integrally formed or molded with the anti-kinking device 614 such that it is of a unitary construction. In some embodiments, the plurality of radial projections 615 could be provided as a separate component, e.g. as a threaded end piece that could be fastened onto corresponding receiving threads of an anti-kinking device. As a particular example of this, the plurality of radial projections 615 could be provided as a threaded end piece that is attached to the threaded internal surface 505 of the anti-kinking device 514, in order to thereby effect a conversion between the device 514 and the device 614. It is further appreciated that one or more of the plurality of radial projections 614 may be formed of a different material than the remainder of the body of device 614 (even if integrally molded), to form a composite structure. For example, the body of device 614 (e.g. the alternating mesh pattern) could be formed of a first material that is softer and more flexible than the plurality of radial projections 615, which could be formed of a very rigid second material.

Although four projections 615 are depicted in FIGS. 21A-C, a greater or lesser number of projections may be employed without departing from the scope of the present disclosure. For example, six radial projections of a generally rectangular or trapezoidal shape could be disposed about the open lip of anti-kinking device 614, in a symmetric (evenly spaced) or asymmetric (unevenly spaced) configuration, although other numbers of projections and geometric shapes can be employed as needed. In some embodiments, a single piece shoulder may be used, e.g. no empty space is provided between the projections 615 and they are instead connected to form a single continuous piece of material.

Together, these projections 615 act as a stop mechanism for a hose or ferrule that is installed within the anti-kinking device 614 (or from an alternate point of view, act as a stop mechanism when the anti-kinking device 614 is installed over top of a hose or ferrule). Together, the plurality of projections 615 create a constricted opening with a first diametric extent, $d_1$, that is smaller than the inner diameter $d_2$ of device 614, as is illustrated in the top-down perspective view of FIG. 21C, which depicts top face 605 of the anti-kinking device 614. In the context of the present example, the plurality of projections 615 are suitably sized such that device 614 can be installed on any hose or hose ferrule with a diameter that is greater than $d_1$ but less than $d_2$. An example installation is shown in FIGS. 22A-B, which depict the anti-kinking device 614 in a longitudinal cross section.

Figure 22A:
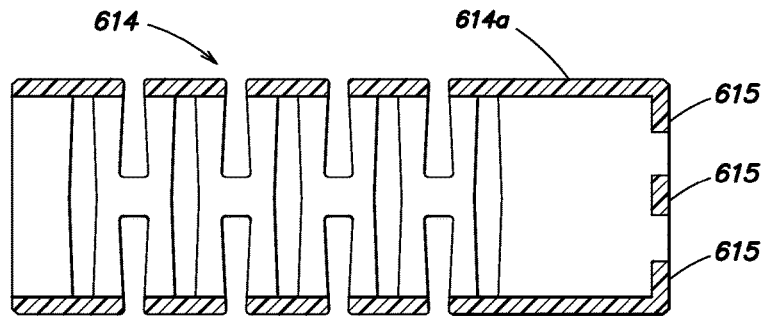
FIG. 22A is a longitudinal cross-sectional view of an anti-kinking device configured with a plurality of radial projections.

FIG. 22A depicts anti-kinking device 614 before installation. Note that this view is identical to the device 514 of FIG. 18, with the exception being that neck portion 614a is free of any threading (internal or external, male or female) and is instead provided with a plurality of projections 615. In this cross-sectional view, only three of the four projections 615 are visible—the top and bottom projections are shaded in a cross-hatch fashion because the plane of the cross-section passes through these two projections, while the middle projection is depicted in a solid shaded fashion as it is located on the far interior wall of device 614, away from the plane of the cross-section. Although not marked in the figure, the diametric extent $d_1$ would be defined as the vertical distance between the cross-hatched upper projection and the cross-hatched lower projection.

Figure 22B:
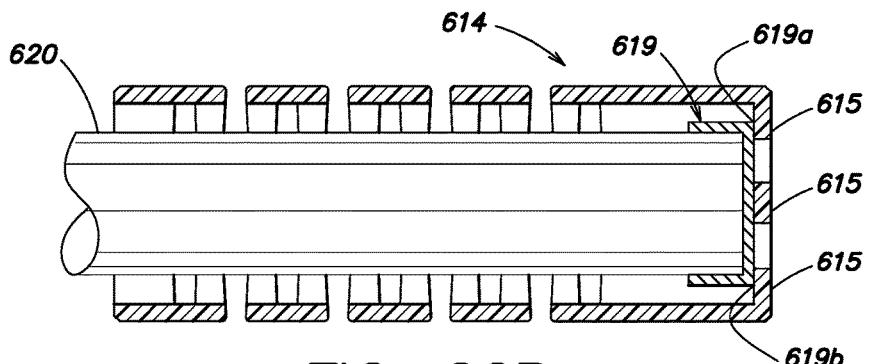
FIG. 22B is a longitudinal cross-sectional view of the anti-kinking device of FIG. 22A installed upon a hose with a hose ferrule.

FIG. 22B depicts anti-kinking device 614 installed upon a hose 620 having a ferrule 619. Ferrule 619 can be crimped to hose 620 in various manners as are known in the art, and is of a design such that a flange—seen in this cross-sectional view as flange portion 619a and flange portion 619b—is provided with a diameter that is greater than or equal to the outer diameter of hose 620. In particular, as illustrated this flange is located at a lip portion at the distal open end of ferrule 619, although it is appreciated that flanges of varying design and location may be employed without departing from the scope of the present disclosure. When the anti-kinking device 614 is installed upon hose 620, the flange portions 619a,b are unable to pass through the first diametric extent $d_1$, and instead abut or rest against one or more of the projections 615 as seen in FIG. 22B. This limits the extent to which the anti-kinking device 614 may move longitudinally with respect to the hose 620, as the projections 615 and flange portions 619a,b act as a stop or a shoulder.

Figure 23:
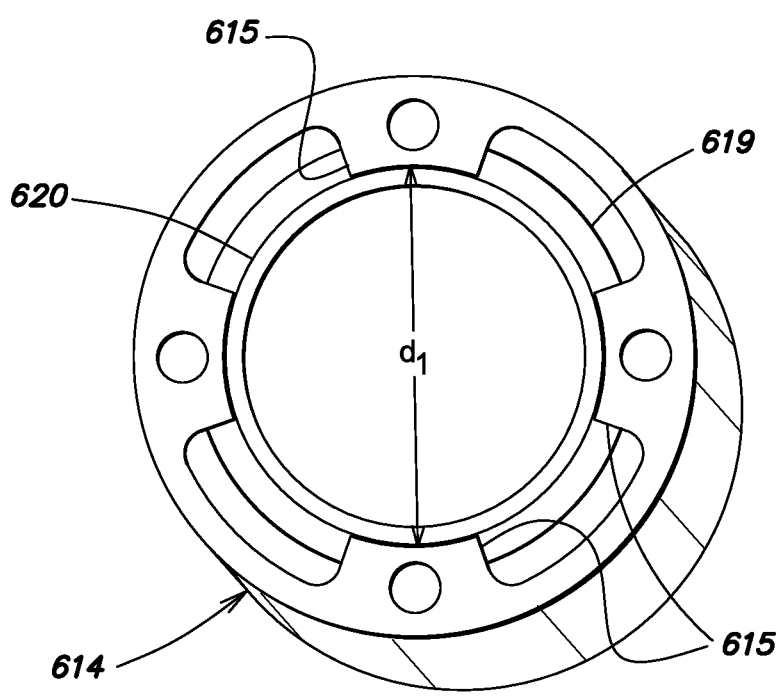
FIG. 23 is a perspective view of an anti-kinking device configured with a plurality of radial projections as installed upon a hose with a hose ferrule.

FIG. 23 provides a perspective view of the anti-kinking device 614 installed upon hose 620 such that the projections 615 abut a flange portion of the hose ferrule 619. As seen in this illustration, the diametric extent $d_1$ is sized such that $d_1$ is smaller than the outer diameter of ferrule 619/the flanged portion 619a,b of the ferrule, such that ferrule 619 (and therefore the hose 620 to which the ferrule is attached) is unable to pass through the opening defined by diametric extent $d_1$. As seen in FIG. 23, the projections 615 extend radially inwards to cover a portion of the ferrule 619, but are not seen to cover any portion of hose 620 or to occlude the through bore for fluid flow through hose 620. In some embodiments, the projections 615 can be configured to extend radially inward to a greater degree, such that a portion of the hose 620 is covered in addition to the ferrule 619. In some embodiments, one or more of the projections 615 may extend radially inward such that the fluid flow through the hose is partially occluded by the projection 615.

Figure 22C:
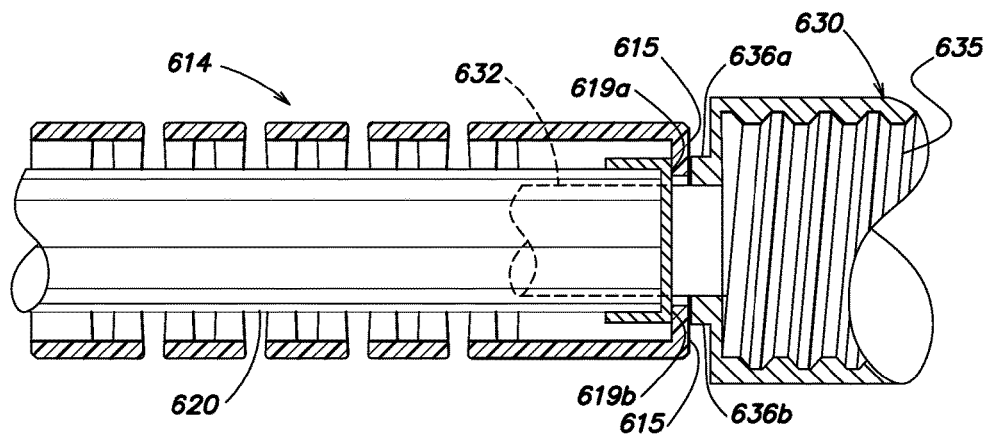
FIG. 22C is a longitudinal cross-sectional view of the anti-kinking device of FIG. 22B with a coupling element installed upon the hose with hose ferrule.

Turning now to FIG. 22C, depicted is a cross-sectional view of the hose and anti-kinking device assembly of FIG. 22B after a coupling element 630 has been installed. In some embodiments, this coupling element can be the same as (or otherwise substantially similar to) the coupler 518 shown in FIGS. 19 and 20. As shown, coupling element 630 comprises an upper coupling portion 635, which here is provided with female threading, although male threading can be also utilized, and further comprises a tail portion 632, which is suitably sized such that it is received within the distal end of both hose 620 and ferrule 619. In other words, tail portion 632 is sized to have a diameter lesser than or equal to the inner diameter of hose 620. This tail portion 632 can later be radially expanded in order to permanently attach coupling element 630 to the hose and anti-kinking device assembly, using one or more techniques as are known in the art.

During installation, as the coupling element 630 is rotated into threaded engagement with ferrule 619, a rear flange (shown here as rear flange portions 636a,b) of coupling element 630 provides an upper stop for the projections 615 of anti-kinking device 614. Accordingly, the anti-kinking device 614 is then constrained in the longitudinal direction between, at a first end, the flange surfaces 619a,b of the hose ferrule 619 and, at a second end, the rear flange portions 636a,b of the coupling element 630. In some embodiments, coupling element 630 can be suitably thick or otherwise suitably tightened such that it contacts the projections 615 and compresses them against the flange surfaces 619a,b of the hose ferrule 619. In this case, anti-kinking device 614 can be rigidly affixed to hose 620, unable to rotate or otherwise be repositioned. However, absent such a compression or firm contact between the projections 615 and the flange surfaces of the ferrule 619 and the attached coupling element, the anti-kinking device 614 will be able to rotate freely with respect to hose 620, constrained only in the longitudinal direction.

The description above has been made with reference to a scenario in which ferrule 619 is installed upon hose 620 via an internal crimp. In some embodiments, ferrule 619 might be installed upon hose 620 via an external crimp, in which case an alternate installation method for anti-kinking device 614 can be employed. Anti-kinking device 614 can first be placed over a free end of hose 620 and slid down the body of the hose, such that hose 620 passes through both open ends of the anti-kinking device 614. Next, ferrule 619 is placed upon the same free end of hose 620 and is externally crimped to the hose (with anti-kinking device 614 below the ferrule 619, still freely floating on the body of hose 620). With the ferrule 619 thus installed, anti-kinking device 614 is then pulled back towards the ferrule 619. At the interface between ferrule 619 and hose 620, the projections 615 must be deflected downwards (away from the free end of the hose upon which the ferrule is installed), such that the diametric extent between the projections temporarily becomes larger than the 'resting' diameter $d_1$. As force is continually applied to the body of anti-kinking device 614, the projections 615 continue to deflect downward and increase the diameter of the opening defined there between. Once suitable deflection and enlargement of this opening between projections 615 has been achieved, anti-kinking device 614 will slide upwards, moving along the body of ferrule 619. Projections 615 will spring back to their un-deflected state (or a relatively less deflected state), received within a groove or thread of ferrule 619 (see, e.g. the grooves/threads of ferrule 519 in FIG. 19). Depending upon the degree of deflection still present, a friction-fit between the ferrule 619 and the projections 615 of the anti-kinking device 614 is achieved. This process of deflecting the projections 615 downwards to increase the diametric extent of their opening until device 614 is able to slip upwards or farther along the body of ferrule 619 can be repeated as desired, until the anti-kinking device 614 has been moved to its final position. If the friction fit between projections 615 and ferrule 619 is suitably weak, then it can still be possible to rotate the anti-kinking device 614 with respect to the hose 620. If the friction fit is sufficiently strong, then anti-kinking device 614 will be rigidly affixed to hose 620 and ferrule 619.

While specific embodiments of the present invention have been shown and described, it should be apparent that many modifications can be made thereto without departing from the spirit and scope of the invention. Accordingly, the invention is not limited by the foregoing description, but is only limited by the scope of the claims appended thereto.

The invention claimed is:

1. A hose system comprising:
a hose inserted through an anti-kinking device, the anti-kinking device comprising:
a cylindrical body having a through-bore with a constant inner diameter, the through-bore defined between a first circular opening of the cylindrical body and a second circular opening of the cylindrical body;
a plurality of interconnected alternating mesh pattern portions, wherein the first circular opening and the second circular opening of the cylindrical body are coupled to one another by the plurality of interconnected alternating mesh pattern portions, the mesh pattern portions comprising a plurality of equally configured rectangular open spaces between each mesh pattern in a relaxed state, each mesh pattern comprising a plurality of substantially rectangular inner walls, a plurality of substantially rectangular outer walls, and a plurality of opposing sidewalls connecting the inner and outer walls, wherein the opposing sidewalls include planar linear portions with respect to the central axis; and
a plurality of projections, the projections arranged circumferentially about the second circular opening to radially extend from a lip of the second circular opening towards a central longitudinal axis of the through-bore, such that a diametric extent between the plurality of projections is smaller than the diameter of the first circular opening and the diameter of the second circular opening.

2. The hose system of claim 1, further comprising a coupling element coupled to a ferrule of the hose, such that one or more of the plurality of projections are constrained between the coupling element and the ferrule of the hose along the central longitudinal axis.

3. The hose system of claim 1, wherein the device is made of durable materials.

4. The hose system of claim 1, wherein the device is made from a synthetic polymer.

5. The hose system of claim 4, wherein the synthetic polymer is selected from the group consisting of acrylonitrile butadiene styrene (ABS), nylon, acrylics, celluloid, cellulose acetate, cyclic olefin copolymer, ethylene-vinyl acetate (EVA), ethylene vinyl alcohol (EVOH), fluoroplastics, polyacrylates, polyacrylonitriles, polyamides, polyamide-imide, polyaryletherketone, polybutadiene, polybutylene, polybutylene terephthalate, polycaprolactone, polychlorotrifluoroethylene, polycarbonate, polyester, polyethylene, polyetherimide, polyethersulfone, polyimide, polyphenylene oxide, polypropylene, polystyrene, polysulfone, polyurethane, polyvinyl acetate, polyvinyl chloride, polyvinylidene chloride, and styrene-acrylonitrile.

6. An anti-kinking device for a hose system comprising:
a substantially cylindrical body made of a synthetic polymer material having a through bore with a constant inner diameter, the through-bore defined between a first circular opening of the cylindrical body and a second circular opening of the cylindrical body;
a neck portion, the neck portion comprising a plurality of projections arranged circumferentially about the second circular opening to radially extend from a lip of the second circular opening towards a central longitudinal axis of the through-bore, such that a diametric extent between the plurality of projections is smaller than the diameter of the first circular opening and the diameter of the second circular opening;
a plurality of interconnected alternating mesh pattern portions connecting the first circular opening and the second circular opening, the mesh pattern portions comprising a plurality of equally configured rectangular open spaces between each mesh pattern in a relaxed state, each mesh pattern comprising a plurality of substantially rectangular inner walls, a plurality of substantially rectangular outer walls, and a plurality of opposing sidewalls connecting the inner and outer walls, wherein the opposing sidewalls include planar linear portions with respect to the central axis; and
wherein the planar linear portions of the opposing sidewalls prevent the plurality of interconnected alternating mesh pattern portions from slipping against each other when the device is in a bent state.

7. A hose system comprising a hose inserted through the anti-kinking device of claim 6.

8. The hose system of claim 7, wherein the device relieves a strain on the hose.

9. The hose system of claim 7, further comprising:
a ferrule attached to an open distal end of the hose, the ferrule having an outer diameter greater than or equal to the outer diameter of the hose and greater than the diametric extent between the plurality of projections; and
a coupling element coupled to the ferrule, such that one or more of the plurality of projections are constrained between the coupling element and the ferrule of the hose along the central longitudinal axis.

10. The hose system of claim 9, wherein the neck portion comprises four or more evenly and symmetrically spaced projections.

11. The hose system of claim 9, wherein the ferrule attached to the open distal end of the hose is crimped to the coupling element, the coupling element capable of coupling the hose system to a source of potable water.

12. The hose system of claim 7, wherein the hose is made from soft vinyl plastic, natural rubber, synthetic rubber or thermoplastic rubber.

13. The hose system of claim 11, wherein the hose system further comprises a female end of the hose.

14. The hose system of claim 13, wherein a ferrule is crimped onto the female end of the hose.

15. The hose system of claim 14, wherein the ferrule has a plurality of parallel concentric rings on the outer surface of the ferrule on the female end of the hose and the neck portion has a helical threaded internal surface that is twisted onto the concentric rings of the ferrule.

* * * * *